United States Patent [19]
Wichers

[11] 3,814,518
[45] June 4, 1974

[54] FILM-MOUNT ASSEMBLY

[76] Inventor: Robert A. Wichers, 527 Roosevelt Ave., Beloit, Kans. 67420

[22] Filed: Feb. 20, 1973

[21] Appl. No.: 334,098

[52] U.S. Cl. .................................. 355/75, 40/158
[51] Int. Cl. ......................................... G03b 27/62
[58] Field of Search ....................... 355/75; 40/158

[56] References Cited
UNITED STATES PATENTS

| | | | |
|---|---|---|---|
| 2,251,184 | 7/1941 | Bohannon | 355/75 |
| 2,418,226 | 4/1947 | Haff | 355/75 |
| 3,077,688 | 2/1963 | Friedman | 40/158 |
| 3,188,762 | 6/1965 | Morrill | 40/158 |

Primary Examiner—John M. Horan
Attorney, Agent, or Firm—Fishburn, Gold & Litman

[57] ABSTRACT

A film-mount assembly for holding translucent material, such as a color negative or transparency from which color prints are to be produced includes first and second sheets preferably joined at a fold line and positioned in overlying or facing relation with each of the first and second sheets having a light-transmitting window therein and substantially in registry with a translucent film or negative extending across the windows and having edge portions of the film or negative in engagement with facing surfaces of the first and second sheets. Peripheral edges of the sheets have notches therein to be used to position the sheets to receive the film and a pair of apertures are positioned adjacent one edge of the sheets and adapted to receive therein register pins to thereby position the assembly and the film therein in a selected position for making a plurality of successive prints therefrom.

1 Claim, 5 Drawing Figures

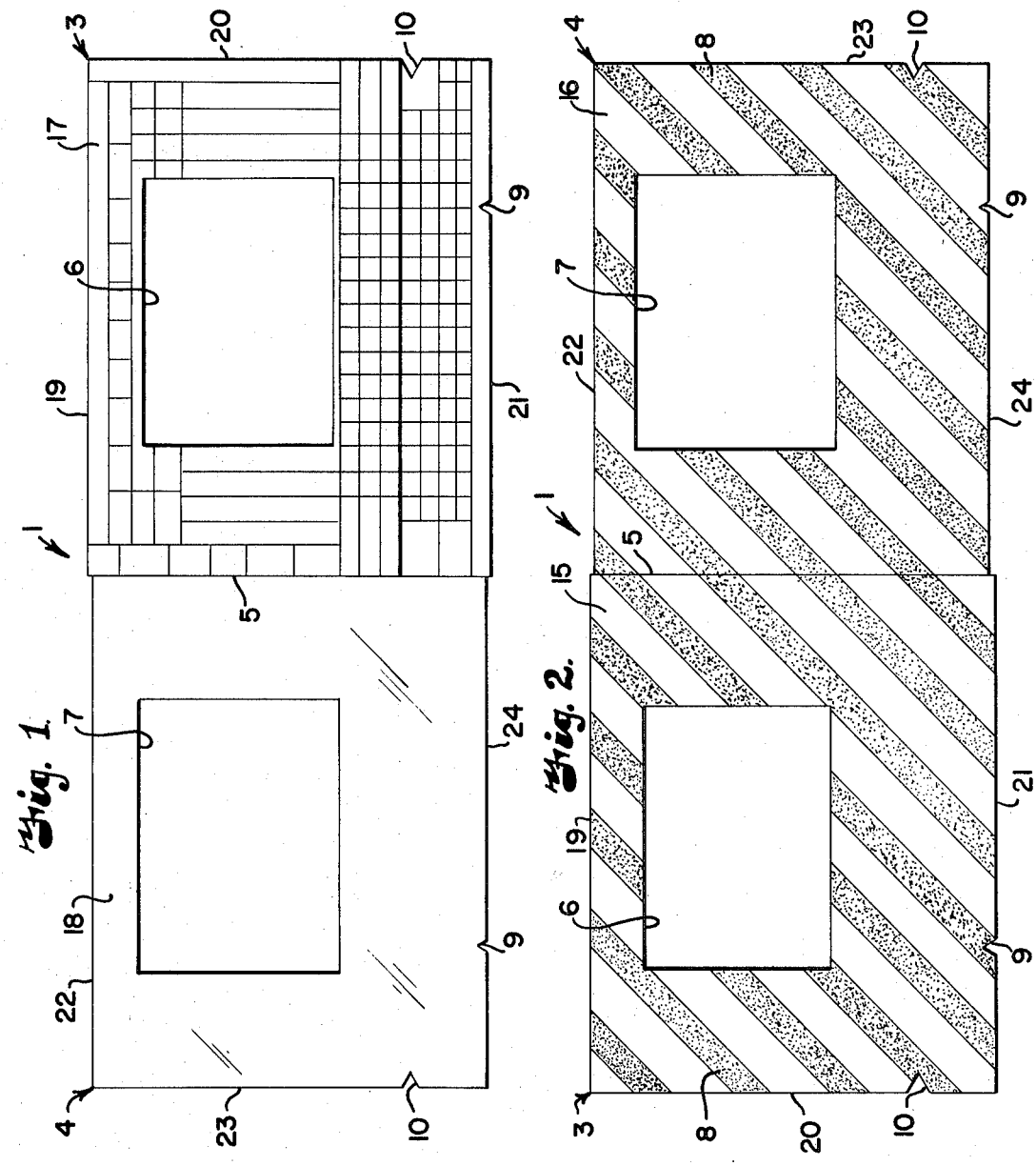

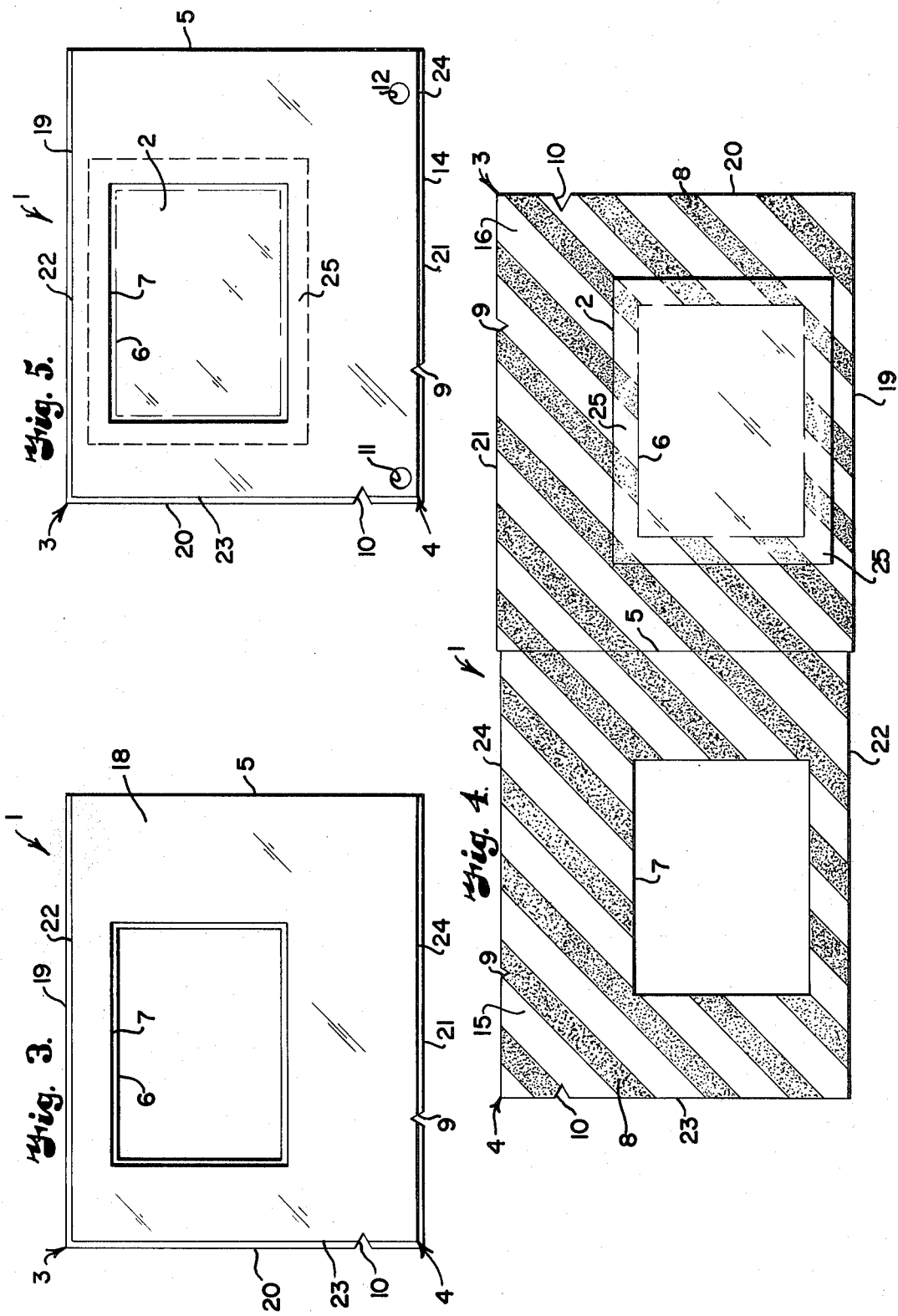

3,814,518

FILM-MOUNT ASSEMBLY

The present invention relates to film-mount assemblies and more particularly to a film-mount assembly for use in making one or a plurality of successive exposures and color prints of a film therein.

The principal objects of the present invention are: to provide a film-mount assembly for holding translucent material, such as color film or negatives from which color prints are to be produced; to provide such a film-mount assembly having indicia, such as notches in selected edges of overlying sheets, to thereby indicate the position of the mount or mask within a printing device and for orientation of the film in the printing device; to provide such a film-mount assembly which substantially increases speed of handling and which is adapted for use in automatic equipment; to provide such a film-mount assembly having indicia, such as pin register holes or apertures to receive pins, for properly positioning the assembly and film therein for a plurality of successive exposures; to provide such a film-mount assembly wherein light-transmitting windows in the overlying sheets are of different sizes whereby the prints will have clear edges and be of a selected size and shape; to provide such a film-mount assembly wherein one of the overlying sheets is slightly larger than the other sheet to thereby serve as a reference for positioning the film-mount assembly in a printing device; to provide such a film-mount assembly adapted to contain information for use in printing, storing, shipping, billing, classification, and automatic handling of the film-mount assembly and prints produced therefrom; and to provide such a film-mount assembly which is economical to manufacture, durable in construction, versatile in use, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment of the present invention and illustrate various objects and features of the film-mount assembly.

FIG. 1 is a side elevational view of exterior surfaces of sheets to be folded to form a film-mount assembly embodying features of the present invention.

FIG. 2 is a side elevational view of interior surfaces of the sheets to form the film-mount assembly.

FIG. 3 is a side elevational view of the sheets in the folded position to show relative sizes thereof.

FIG. 4 is a side elevational view of the sheets in position for receiving a translucent film.

FIG. 5 is a side elevational view of a finished film-mount assembly having the translucent film in position between the sheets.

Referring more in detail to the drawings:

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriate detailed structure.

In the disclosed embodiment of the present invention, the reference numeral 1 generally designates a film-mount assembly for use in holding a color negative or transparency including a translucent film, such as color negative or film 2, from which one or more color prints (not shown) are to be produced. The film-mount assembly 1 includes a first sheet 3 and a second sheet 4 preferably joined at a fold line 5 and positioned in overlying or facing relation with alignable light-transmitting windows 6 and 7 in the first sheet 3 and the second sheet 4 respectively. The light-transmitting windows 6 and 7 are substantially in registry and a translucent negative or film 2 is positioned between the sheets across the windows 6 and 7 and has edge portions of the film 2 in engagement with facing surfaces of the first sheet 3 and the second sheet 4 and held in place by adhesive 8 thereon.

Indicia, such as corner notches, edge notches, apertures, and the like, are provided for use in properly positioning the assembly 1 in a printing device and for positioning portions of the assembly 1 to receive the translucent material. In the illustrated embodiment, selected peripheral edges of the sheets 3 and 4 have notches 9 and 10 therein to be used to position the sheets 3 and 4 to receive the film 2 and a pair of apertures 11 and 12 are positioned adjacent one edge 14 of the film-mount assembly 1 and are adapted to receive therein register pins (not shown) to thereby position the assembly 1 and the film 2 therein in a selected position for making a plurality of successive exposures and prints therefrom.

In the illustrated embodiment of the film-mount assembly, the first sheet 3 is slightly larger than the second sheet 4 and the sheets 3 and 4 are each generally rectangular in shape. When the first and second sheets 3 and 4 are in facing relation with the translucent material, such as a transparency or color negative 2, therebetween the sheets 3 and 4 have interior surfaces 15 and 16 respectively and exterior surfaces 17 and 18 respectively.

As shown in FIGS. 1, 2, 3, and 5, the first sheet 3 has a top edge 19, side edge 20, and bottom edge 21 with the bottom edge 21 defining the one edge 14 of the film-mount assembly 1 having the apertures 11 and 12 adjacent thereto. The second sheet 4 also has a top edge 22, side edge 23, and bottom edge 24. The side edge 20 of the first sheet 3 and side edge 23 of the second sheet 4 have the notch 10 therein with the notches 10 being substantially in alignment or registry when the sheets 3 and 4 are in overlying or facing relation. The bottom edges 21 and 24 of the first and second sheets 3 and 4 respectively have the notches 9 therein with the notches 9 being substantially in alignment or registry when the sheets 3 and 4 are in overlying or facing relation.

It is desirable to record selected information on the film-mount assembly, therefore, at least one exterior surface of the sheets 3 and 4 has a plurality of generally vertical and horizontal lines defining spaces within which selected information may be recorded. Such information may include optical characteristics of the film or negative 2, code classification of the finished prints, information concerning the respective account, type and number of prints to be used with the color negative 2, billing information, and the like.

The illustrated first sheet 3 has edge portions adjacent the top edge 19, side edge 20, and bottom edge 21 which extend beyond the top edge 22, side edge 23, and bottom edge 24 respectively of the second sheet 4 whereby at least one of the edges 19, 20, and 21 of the first sheet 3 defines a reference edge of the film-mount assembly 1 when placed on a light table or box (not shown) or in a printer or printing device (not shown).

The light-transmitting windows 6 and 7 may be any desired shape such as rectangular, square, oval, circular, heart shaped, triangular, and the like, all with or without recesses in selected edges thereof. The illustrated windows 6 and 7 are generally rectangular in shape and the first sheet 3 has edges defining the light-transmitting window 6 therein which define edge portions extending beyond respective edges of the second sheet 4 which define the light-transmitting window 7 therein whereby the window 6 in the first sheet 3 is smaller than the window 7 in the second sheet 4. The window defining edges in the first sheet 3 thereby define the edges or periphery of the print produced using the film-mount assembly 1.

The adhesive 8 is preferably pressure sensitive which will adhere only to like adhesive and which may be easily separated and is positioned on the interior surfaces 15 and 16 of the first and second sheets 3 and 4. The adhesive is preferably arranged in a pattern which will only adhere in a selected plurality of spaced areas. In the illustrated embodiment, the adhesive 8 is arranged in a plurality of elongated strips which are laterally spaced and substantially parallel and extend diagonally across the interior surfaces 15 and 16 of the first and second sheets 3 and 4 when same are in an unfolded position. The strips of adhesive are thereby arranged to form a crossing pattern with points of crossing adhered together when the first and second sheets 3 and 4 are in the folded or assembled position with the interior surfaces 15 and 16 in facing relation.

The apertures 11 and 12 are positioned adjacent and substantially equally spaced from the bottom edges 21 and 24 of the first and second sheets 3 and 4 respectively and the apertures 11 and 12 are substantially in registry when the first and second sheets 3 and 4 are in facing or overlying relation. The apertures 11 and 12 are each adapted to receive therein a respective register pin whereby the film-mount assembly 1 is positioned in a selected relation with the pins so that a plurality of exposures of the color negative or film 2 will all be in registry, such as a plurality of exposure each using a different filter.

The color negative or film 2 has a base side or surface and an emulsion or side or surface and in the illustrated embodiment, it is preferred to position the emulsion side of the color negative 2 facing the interior surface 15 of the first sheet 3 whereby when the film-mount assembly 1 is positioned in a printer or printing device (not shown), the emulsion side of the color negative or film 2 will be adjacent or in contact with the material to be printed. The film or color negative 2 has edge portions 25 extending beyond the edges defining the light-transitting window 6 in the first sheet 3 and into engagement with the strips of adhesive 8 on the interior surfaces 15 and 16 to thereby be retained in the assembly.

FIG. 4 illustrates the method for mounting the color negative 2 in the film-mount assembly 1 wherein the notches 9 and 10 engage suitable pins or projections (not shown) of a light table or box (not shown) to thereby position the light-transmitting window 6 in a selected position. The film or negative 2 is then positioned overlying the window 6 with the edge portion 25 thereof in engagement with the adhesive 8 on the interior surface 15 of the first sheet 3. After the negative or film 2 is in the desired position, pressure is applied to the edge portions 25 and the second sheet 4 is folded over the first sheet 3 with pressure being applied to the second sheet 4 to secure the sheets 3 and 4 together with the negative 2 therebetween. The apertures 11 and 12 are then punched and the film-mount assembly 1 is prepared for use within a printer or printing device (not shown).

The sheets 3 and 4 of the film-mount assembly 1 may be formed of any suitable material and be either opaque or translucent as desired for use with either translucent or opaque material 2 mounted between the sheets 3 and 4 and the windows 6 and 7 therein.

It is to be understood that while I have illustrated and described one form of my invention, it is not to be limited to the specific form or arrangement of parts herein described and shown.

What I claim and desire to secure by Letters Patent is:

1. A film-mount assembly comprising:
   a. a generally rectangular first sheet and a generally rectangular second sheet joined at a fold line, said first and second sheets each having interior and exterior surfaces and peripheral edges, said interior surfaces being in facing relation when said first and second sheets are in facing relation, one of said first and second sheets having each of the edge portions thereof extending beyond a respective one of the peripheral edges of the other of said first and second sheets when said first and second sheets are in facing relation;
   b. edges within said first sheet and edges within said second sheet defining a respective light-transmitting window in each of said first and second sheets, said windows being substantially in registry when said first and second sheets are in facing relation, the edges defining in the light-transmitting window in the one of said first and second sheets each being positioned in lateral spaced relation with a respective one of the edges defining the light-transmitting window in the other of said first and second sheets when said first and second sheets are in facing relation whereby the window in the one of said first and second sheets is smaller than the window in the other of said first and second sheets;
   c. pressure sensitive adhesive on the interior surface of said first sheet and on the interior surface of said second sheet, said adhesive being arranged in a plurality of spaced strips on the interior surface of said first sheet and on the interior surface of said second sheet, said strips of adhesive being arranged to form a crossing pattern when said first and second sheets are in facing relation;
   d. a generally rectangular sheet of translucent film positioned between said first and second sheets and extending across said respective light-transmitting windows therein and having edge portions thereof maintained in position by said adhesive;
   e. indicia means in selected peripheral edges of said first and second sheets for positioning said sheets to receive said translucent film, said selected peripheral edges of said first and second sheets each having at least one notch therein thereby defining said indicia means, said notches being substantially in registry when said first and second sheets are in facing relation; and f. at least one pair of spaced apertures in each of said first and second sheets, said apertures being substantially in registry when said first and second sheets are in facing relation, said apertures being adjacent and substantially equally spaced from a selected one of the peripheral edges of the one of said first and second sheets, said apertures each being adapted to receive therein a respective pin whereby the film-mount assembly is positioned in a selected relation with the pins thereby positioning said sheets and the film therebetween for making exposures of same.

* * * * *